United States Patent [19]

Cook et al.

[11] Patent Number: 4,901,974
[45] Date of Patent: Feb. 20, 1990

[54] CANISTER PURGE SOLENOID VALVE

[75] Inventors: John E. Cook; William C. Gillier, both of Chatham, Canada

[73] Assignee: Siemens-Bendix Automotive Electronics Limited, Chatham, Canada

[21] Appl. No.: 350,430

[22] Filed: May 11, 1989

[51] Int. Cl.⁴ .............................................. F16K 31/06
[52] U.S. Cl. ............................ 251/129.15; 251/129.05
[58] Field of Search ....................... 251/129.15, 129.05

[56] References Cited

U.S. PATENT DOCUMENTS 3,013,768 12/1961 La Mastra ...................... 251/129.15
4,582,294 4/1986 Fargo ............................. 251/129.15

Primary Examiner—Arnold Rosenthal
Attorney, Agent, or Firm—Russel C. Wells; George L. Boller

[57] ABSTRACT

A canister purge solenoid valve is constructed and arranged to provide reduced operating noise and decreased armature wear as the armature reciprocates within a bore in response to solenoid energization and de-energization. The armature contains an elastomeric valve head that is biased normally closed against the valve seat. When the solenoid assembly is energized, the armature is retracted. The armature's momentum is initially absorbed by the elastomeric valve head making contact with the solenoid assembly at one end of the bore. Final absorption of the armature's momentum is shared by continuing contact of the valve head with the solenoid assembly and by an elastomeric limit stop that is disposed between the armature and the stator. In this way the elastomeric limit stop is not required to absorb the full momentum of the retracting armature.

4 Claims, 2 Drawing Sheets

CANISTER PURGE SOLENOID VALVE

BACKGROUND AND SUMMARY OF THE INVENTION

This invention relates to a canister purge solenoid valve. More especially, the invention relates to an improvement for reducing wear and operating noise in such a valve.

A canister purge solenoid valve is a device that is used in certain evaporative emission control systems of automotive vehicles. Its purpose is to control the flow of fuel vapors from a collection canister, commonly called a carbon canister, to the engine intake manifold. The flow is controlled by means of a pulse width modulated signal that is applied to the valve's solenoid from the engine computer. This in turn produces a corresponding modulation of the valve so that the average open time for the valve during each cycle of the modulating signal is similarly modulated.

Evaporative emission standards for automotive vehicles are established by government regulations. Due to changes in applicable standards, evaporative emission systems are required to remove increased amounts of fuel vapors from carbon canisters. Accordingly, it has been necessary to increase the size of the canister purge solenoid valve. Two undesired results of the solenoid valve enlargement are an increase in operating noise level and increased wear on the solenoid's plunger (armature).

The present invention relates to a new and unique construction that is effective to reduce both the operating noise level and the armature wear. Briefly, the elastomeric valve head that opens and closes against the valve seat as the armature is reciprocated, is configured to form one travel stop for the armature during retraction, and an elastomeric member is disposed between the opposite end of the armature and the stator to form a second travel stop. The two travel stops are arranged such that the first travel stop is effective upon armature retraction to begin absorbing the armature momentum just slightly before the second armature stop. The result is a significant reduction in operating noise level and improved durability for the second travel stop.

The foregoing, along with additional features, advantages, and benefits of the invention, will be seen in the ensuing description and claims, which should be considered with the accompanying drawings. The drawings disclose a preferred embodiment of the invention according to the best mode contemplated at the present time in carrying out the invention.

DESCRIPTION OF THE PREFERRED EMBODIMENT

Figure 1:
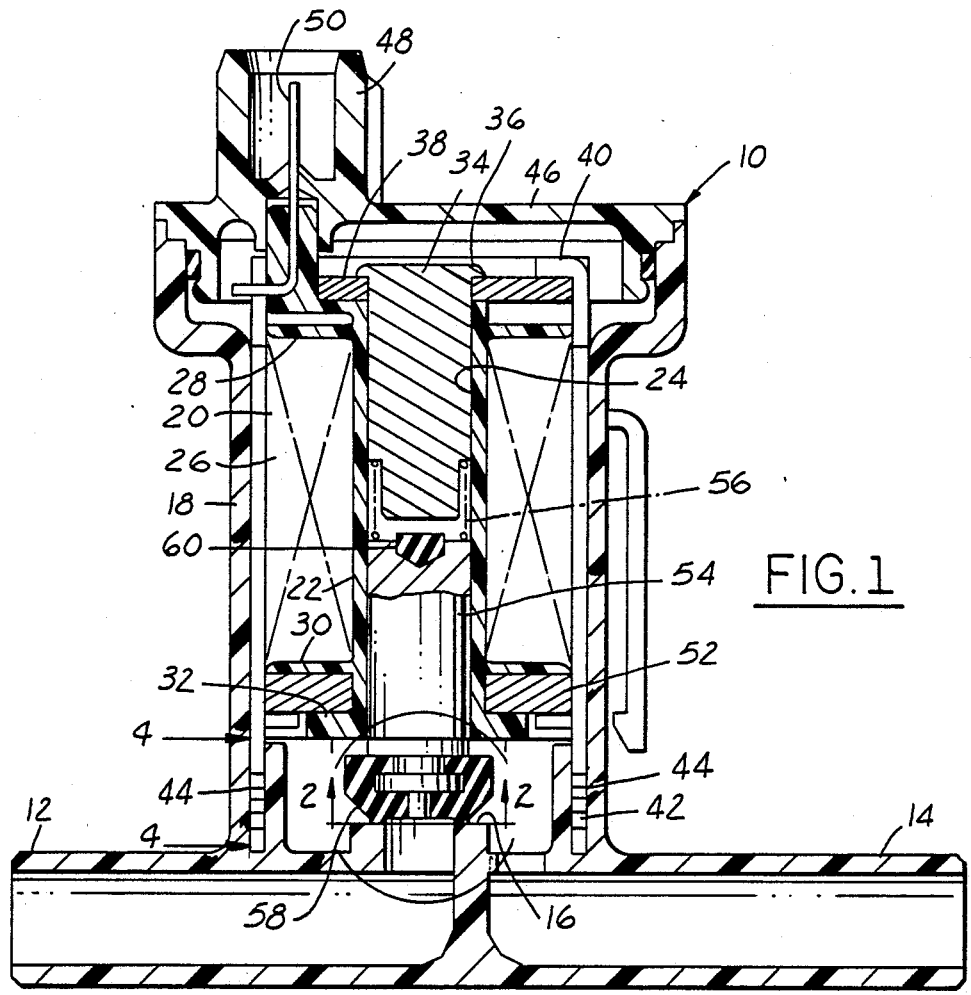
FIG. 1 is a longitudinal cross sectional view through a canister purge solenoid valve according to the present invention.
Figure 2:
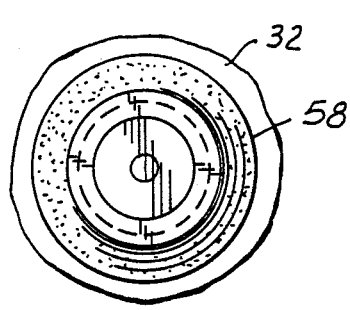
FIG. 2 is a fragmentary transverse cross sectional view taken in the direction of arrows 2—2 in FIG. 1 and enlarged.
Figure 3:
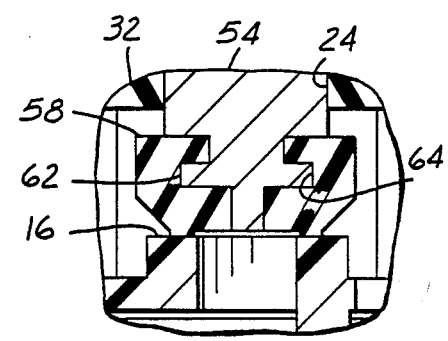
FIG. 3 is an enlarged view taken in circle 3 of FIG. 1.

FIG. 1 shows a canister purge solenoid valve 10 embodying principles of the invention. Valve 10 comprises an inlet 12 that is adapted to be connected to a carbon canister and an outlet 14 that is adapted to be connected to intake manifold vacuum. Between inlet 12 and outlet 14 is a valve seat 16. The inlet, outlet, and valve seat are part of the valve body which includes a cylindrical wall 18 that is perpendicular to the inlet and outlet. A solenoid assembly 20 is disposed within wall 18.

Figure 4:
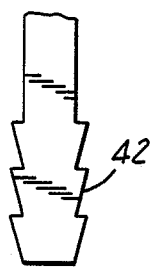
FIG. 4 is a fragmentary view taken in the direction of arrows 4—4 in FIG. 1.

Solenoid assembly 20 comprises a plastic bobbin 22 having a circular, cylindrical bore 24. An electric solenoid coil 26 is wound on bobbin 22 between bobbin flanges 28, 30. The bobbin has a third flange 32 at the end of bore 24 confronting seat 16. The solenoid assembly further comprises a magnetically conductive stator 34 that is fitted into the upper end of bore 24. The stator has a lip 36 that traps a magnetically conductive washer member 38 against the upper end of the bobbin bore. A magnetically conductive shell 40 fits over washer member 38 and around the outside of the solenoid assembly This shell has barbed lower ends 42 (FIG. 4) that are press-fitted into slots 44 in the valve body to cause the solenoid assembly to be retained within wall 18. After assembly of the solenoid into the valve body, the upper end of wall 18 is closed by a cap 46 which includes a connector plug structure 48 containing terminals 50 to which the ends of solenoid coil 26 are connected. Connector plug structure 48 is adapted to be connected to a mating plug (not shown) that leads to the engine computer. The computer sends a pulse width modulated signal to valve 10 that pulse width modulates coil 26.

The solenoid assembly still further includes a magnetically conductive member 52 disposed between flanges 30 and 32, and an armature 54 that has a sliding fit within the lower end of bore 24. A helical spring 56 that is disposed between stator 34 and armature 54 biases the armature away from the stator so that when the solenoid coil is not energized, an elastomeric valve head 58 that is at the end of the armature is forced against seat 16 to block flow between inlet 12 and outlet 14. When the solenoid coil is energized, armature 54 is increasingly retracted into bore 24, compressing spring 56 in the process and unseating valve head 58 from seat 16 so that flow can occur from inlet 12 to outlet 14.

In accordance with principles of the invention, valve head 58 is constructed to have particular relationships with bobbin 22. Specifically, the valve head radially overlaps flange 32, and it is made thick enough, so that when the solenoid coil is energized to retract the armature, the outer margin of the valve head will abut a margin of flange 32 around bore 24. Moreover, such abutment will take place initially just before an elastomeric limit stop 60 at the opposite end of armature 54 abuts the confronting end of stator 34. Limit stop 60 is fitted into a coaxial depression in the end of the armature such that a portion of the limit stop protrudes from the end of the armature. It is this protruding portion of limit stop 60 that impacts stator 34 when the armature is retracted so that metal-to-metal contact between armature and stator is avoided. When the armature is retracted, the valve head functions to initially absorb some of the momentum of the armature before limit stop 60 contacts stator 34. Hence the full impact is not absorbed by limit stop 60 alone, but rather the final impact absorption is shared by the valve head 58 and the limit stop 60 after the initial impact has been absorbed by valve head 58. The result is a quieter valve operation and reduced wear on limit stop 60.

The elastomeric material for the valve head is preferably one that is resistant to fuels, and fluorosilicone rubber is one suitable material. Both the valve head and the limit stop can be insert molded onto armature 54 by conventional insert molding techniques. The end of the armature contains a circumferential flange 62 so that after valve head 58 has been molded, flange 62 is received in a circumferential groove 64 formed in valve head 58.

Figure 5:
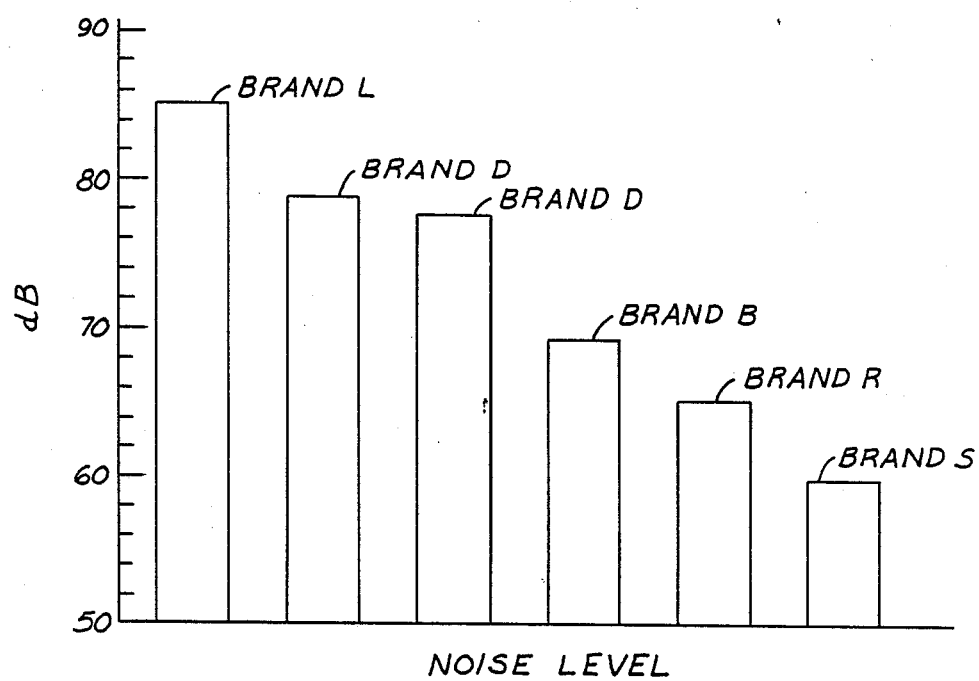
FIG. 5 is a diagram comparing the operating noise level of the valve of the present invention with the operating noise levels of other commercial valves.

FIG. 5 is a graph that compares the operating noise level of valve 10 with the noise levels of other commercial canister purge valves. Valve 10 is designated BRAND S in the graph, and the graph shows that valve 10 has a significantly lower operating noise level than the other valves under the same test conditions. Hence, the invention provides a meaningful improvement in canister purge solenoid valves.

While a preferred embodiment of the invention has been disclosed, it will be appreciated that principles are applicable to other embodiments.

What is claimed is:

1. In a solenoid actuated valve that comprises a valve seat disposed between an inlet and an outlet, a solenoid assembly that comprises a bore which is coaxial with said valve seat, a stator that is disposed in said bore, an armature that is disposed in said bore between said stator and said valve seat and reciprocates within said bore in response to the energizing and de-energizing of said solenoid assembly, and an elastomeric valve head member that is on said armature externally of said bore and that seats on and unseats from said seat as said armature reciprocates within said bore, the improvement characterized in that an elastomeric limit stop is disposed between said stator and said armature to absorb impact between said armature and said stator as the armature moves away from said seat, said valve head member radially overlaps the solenoid assembly around said bore and is thick enough not only to abut said seat but also to abut said solenoid assembly around said bore as the armature is reciprocated within said bore, and when the armature is retracted into said bore, said valve head member initially contacts the solenoid assembly to initially absorb momentum of the armature, and thereafter the final impact absorption is shared by said valve head member acting against said solenoid assembly around said bore and by said limit stop acting between said stator and said armature.

2. The improvement set forth in claim 1 wherein said valve head member comprises an internal circumferential groove and said armature comprises a circumferential flange occupying said groove.

3. The improvement set forth in claim 1 wherein said limit stop is affixed to said armature.

4. The improvement set forth in claim 3 wherein said limit stop is partially embedded in a depression that is centrally formed in an end of the armature facing the stator.

* * * * *